United States Patent
Kano et al.

(10) Patent No.: US 10,343,305 B2
(45) Date of Patent: Jul. 9, 2019

(54) CARBON FIBER RECOVERY METHOD

(71) Applicant: TOYOTA JIDOSHA KABUSHIKI KAISHA, Toyota-shi, Aichi-ken (JP)

(72) Inventors: Akira Kano, Toyota (JP); Daisuke Sakuma, Nagoya (JP); Keisuke Isomura, Kariya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/126,122

(22) Filed: Sep. 10, 2018

(65) Prior Publication Data

US 2019/0099921 A1   Apr. 4, 2019

(30) Foreign Application Priority Data

Oct. 2, 2017   (JP) ................. 2017-192944

(51) Int. Cl.
*B32B 43/00* (2006.01)
*B29B 17/02* (2006.01)
*C08K 7/06* (2006.01)
*D01F 9/12* (2006.01)
*C08J 11/16* (2006.01)
*C08J 11/08* (2006.01)
*B32B 38/10* (2006.01)

(52) U.S. Cl.
CPC ...... *B29B 17/02* (2013.01); *B29B 2017/0203* (2013.01); *B29B 2017/0293* (2013.01); *B32B 38/10* (2013.01); *B32B 43/006* (2013.01); *C08J 11/08* (2013.01); *C08J 11/16* (2013.01); *C08K 7/06* (2013.01); *D01F 9/12* (2013.01); *Y10T 156/1116* (2015.01); *Y10T 156/1153* (2015.01); *Y10T 156/1911* (2015.01); *Y10T 156/1961* (2015.01)

(58) Field of Classification Search
CPC . B32B 43/006; B32B 38/10; Y10T 156/1116; Y10T 156/1153; Y10T 156/1911; Y10T 156/1961; D01F 9/12; C08K 7/06; C08J 11/08; C08J 11/16
USPC .......... 156/704, 711, 752, 761, 762
See application file for complete search history.

(56) References Cited

U.S. PATENT DOCUMENTS

| 2013/0118691 A1* | 5/2013 | George | ............ B29B 17/02 156/704 |
| 2016/0115301 A1* | 4/2016 | Zhao | ............ C08J 11/08 423/447.1 |

FOREIGN PATENT DOCUMENTS

| JP | 2000-80199 A | 3/2000 |
| JP | 2001240697 A * | 9/2001 ............ B29B 17/02 |

(Continued)

*Primary Examiner* — Mark A Osele
*Assistant Examiner* — Nickolas R Harm
(74) *Attorney, Agent, or Firm* — Sughrue Mion, PLLC

(57) ABSTRACT

A carbon fiber recovery method for recovering carbon fibers from a fiber reinforced plastic member having a carbon fiber reinforced plastic (CFRP) layer on which a glass fiber reinforced plastic (GFRP) layer is formed is provided. This method includes: forming a cut that penetrates through the GFRP layer and reaches the CFRP layer in the fiber reinforced plastic member; causing a heated phosphorus-containing solution to penetrate from the cut and separating the CFRP layer from the GFRP layer in the vicinity of an interface between the CFRP layer and the GFRP layer; and dissolving, by a resin solution, a resin part of the CFRP layer from which the GFRP layer has been removed and then recovering the remaining carbon fibers.

5 Claims, 6 Drawing Sheets

(56) References Cited

FOREIGN PATENT DOCUMENTS

| JP | 2007-246831 A | 9/2007 |
|----|---------------|--------|
| JP | 2011-74204 A  | 4/2011 |

* cited by examiner

CARBON FIBER RECOVERY METHOD

CROSS REFERENCE TO RELATED APPLICATIONS

This application is based upon and claims the benefit of priority from Japanese patent application No. 2017-192944, filed on Oct. 2, 2017, the disclosure of which is incorporated herein in its entirety by reference.

BACKGROUND

The present disclosure relates to a carbon fiber recovery method, and in particular, to a carbon fiber recovery method for recovering carbon fibers from a fiber reinforced plastic member having a carbon fiber reinforced plastic layer on which a glass fiber reinforced plastic layer is formed.

Carbon Fiber Reinforced Plastic (CFRP) has recently been used more and more for airplanes, automobiles and the like since it has a high strength and a light weight. In accordance therewith, methods for recovering carbon fibers from used CFRP to recycle them have been discussed. Japanese Unexamined Patent Application Publication No. 2011-074204 discloses, for example, a method of dissolving a resin part of a CFRP layer using a resin solution that contains concentrated sulfuric acid and then recovering remaining carbon fibers.

By the way, in a hydrogen tank of a fuel-cell vehicle, for example, a hybrid fiber reinforced plastic including a CFRP layer on which a Glass Fiber Reinforced Plastic (GFRP) layer is formed is used.

SUMMARY

The present inventor has found the following problem regarding the method of recovering carbon fibers from the fiber reinforced plastic member having the CFRP layer on which the GFRP layer is formed.

When, for example, the resin solution that contains concentrated sulfuric acid disclosed in Japanese Unexamined Patent Application Publication No. 2011-074204 is used for the fiber reinforced plastic member, the resin part of the CFRP layer and the resin part of the GFRP layer are dissolved substantially at the same time. It is therefore difficult to separate the remaining carbon fibers from the glass fibers after the resin parts are dissolved.

Therefore, besides a problem that it is difficult to recover the carbon fibers in the first place, there is a problem that glass fibers end up being mixed into the carbon fibers even when the carbon fibers are successfully recovered.

When the glass fibers are mixed into the carbon fibers, it is possible that a desired strength may not be obtained in a member made of the recovered carbon fibers.

The present disclosure has been made in view of the aforementioned problem and aims to provide a carbon fiber recovery method capable of suppressing glass fibers from being mixed into carbon fibers.

A carbon fiber recovery method according to one aspect of the present disclosure is a carbon fiber recovery method for recovering carbon fibers from a fiber reinforced plastic member having a carbon fiber reinforced plastic layer on which a glass fiber reinforced plastic layer is formed, the method comprising:

forming a cut that penetrates through the glass fiber reinforced plastic layer and reaches the carbon fiber reinforced plastic layer in the fiber reinforced plastic member;

causing a heated phosphorus-containing solution to penetrate from the cut and separating the carbon fiber reinforced plastic layer from the glass fiber reinforced plastic layer in the vicinity of an interface between the carbon fiber reinforced plastic layer and the glass fiber reinforced plastic layer; and dissolving, by a resin solution, a resin part of the carbon fiber reinforced plastic layer from which the glass fiber reinforced plastic layer has been removed and then recovering the remaining carbon fibers.

In the carbon fiber recovery method according to one aspect of the present disclosure, the heated phosphorus-containing solution penetrates from the cut that penetrates through the glass fiber reinforced plastic (GFRP) layer, and the resin part formed in the interface between the carbon fiber reinforced plastic (CFRP) layer and the GFRP layer is preferentially dissolved. Then, after the GFRP layer is separated and removed from the CFRP layer, only the resin part of the CFRP layer is dissolved by the resin solution and the remaining carbon fibers are recovered. It is therefore possible to suppress the glass fibers from being mixed with the carbon fibers when the carbon fibers are recovered.

When the heated phosphorus-containing solution penetrates from the cut, the fiber reinforced plastic member may be immersed in the phosphorus-containing solution. Otherwise, when the heated phosphorus-containing solution penetrates from the cut, the phosphorus-containing solution may be applied to a surface of the fiber reinforced plastic member. According to the aforementioned structure, it is possible to easily cause the heated phosphorus-containing solution to penetrate from the cut.

A phosphate concentration in the phosphorus-containing solution may be set to be 60% or higher. It is therefore possible to recover the carbon fibers with a high yield.

Further, the resin solution may contain concentrated sulfuric acid. It is therefore possible to increase the dissolution speed of the resin part of the CFRP layer from which the GFRP layer has been removed.

According to the present disclosure, it is possible to provide a carbon fiber recovery method capable of suppressing glass fibers from being mixed with the carbon fibers.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

With reference to the drawings, a specific embodiment of the present disclosure will be explained in detail below. However, the present disclosure is not limited to the following embodiment. For clarity of explanation, the following description and the drawings are simplified as appropriate.

(First Embodiment)
<Structure of Fiber Reinforced Plastic Member>

First, with reference to FIGS. 1 and 2, a fiber reinforced plastic member used for a carbon fiber recovery method according to a first embodiment will be explained.

Figure 1:
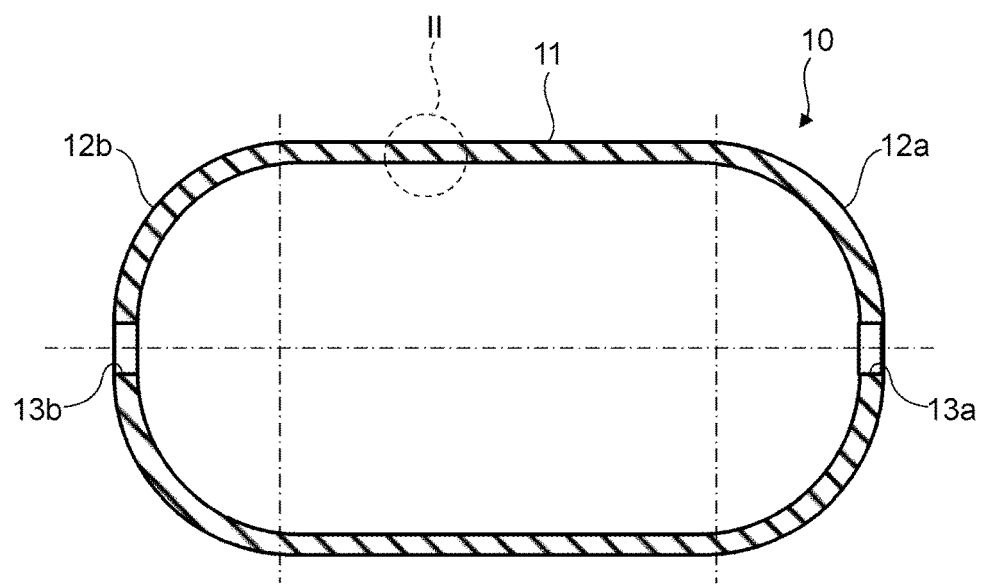
FIG. 1 is an overall cross-sectional view of a fiber reinforced plastic member used for a carbon fiber recovery method according to a first embodiment.

FIG. 1 is an overall cross-sectional view of the fiber reinforced plastic member used for the carbon fiber recovery method according to the first embodiment. FIG. 2 is an enlarged cross-sectional view of a dashed circle II shown in FIG. 1.

As shown in FIG. 1, a fiber reinforced plastic member 10 used for the carbon fiber recovery method according to this embodiment is a pressure vessel including a cylindrical part 11 and convexly curved dome parts 12a and 12b provided in the respective ends of the cylindrical part 11. This fiber reinforced plastic member 10 is preferably applicable, for example, to a hydrogen tank of a fuel-cell vehicle.

The dome parts 12a and 12b are integrally provided with the cylindrical part 11 in such a way that they project in the axially outward direction from the respective ends of the cylindrical part 11. The dome parts 12a and 12b respectively have top parts in which throughholes 13a and 13b are formed so that a metal cap (not shown) can be mounted on each of the throughholes 13a and 13b.

Figure 2:
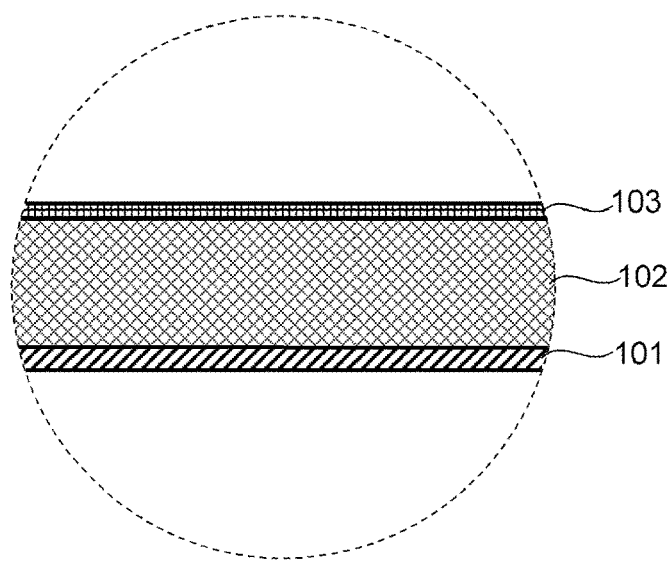
FIG. 2 is an enlarged cross-sectional view of a dashed circle II shown in FIG. 1.

As shown in FIG. 2, the overall fiber reinforced plastic member 10 has a structure in which a CFRP layer 102 and a GFRP layer 103 are formed on an outer surface of a plastic liner 101.

The plastic liner 101 is a container made of resin to confine and contain hydrogen. The plastic liner 101 is made of, for example, a nylon-based resin having a thickness of several mm.

The CFRP layer 102 is formed on the outer surface of the plastic liner 101 in order to ensure the pressure-resistance strength of the fiber reinforced plastic member 10. To form the CFRP layer 102, carbon fibers with an epoxy-based resin, a nylon-based resin, a vinylester-based resin or the like on their surfaces are repeatedly wound onto the outer surface of the plastic liner 101. The carbon fibers each have a diameter of about 5 to 7 µm. Further, the CFRP layer 102 has a thickness of, for example, about 20 mm.

The GFRP layer 103 is formed on the CFRP layer 102 in order to protect the surface of the fiber reinforced plastic member 10. To form the GFRP layer 103, glass fibers with the epoxy-based resin, the nylon-based resin, the vinylester-based resin or the like on their surfaces are repeatedly wound onto the outer surface of the CFRP layer 102. The resin that forms the CFRP layer 102 and the resin that forms the GFRP layer 103 may preferably be of the same type so that these layers can be easily manufactured. The glass fibers each have a diameter of about 10 to 20 µm. Further, the GFRP layer 103 has a thickness of, for example, about several mm.

Figure 3:
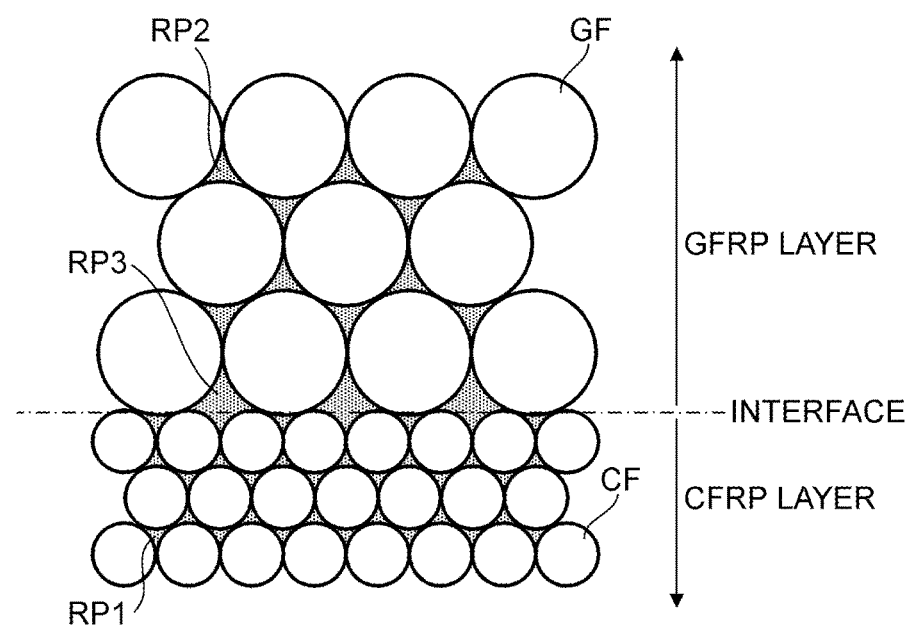
FIG. 3 is an enlarged cross-sectional view of an interface part between a CFRP layer 102 and a GFRP layer 103.

FIG. 3 is an enlarged cross-sectional view of an interface part of the CFRP layer 102 and the GFRP layer 103. As shown in FIG. 3, each of the gaps between the fibers in the interface between the CFRP layer 102 and the GFRP layer 103 is larger than that in the CFRP layer 102 and the GFRP layer 103 due to the difference between the diameter of each of the carbon fibers CF and the diameter of each of the glass fibers GF.

A resin part RP1 is formed in the gap between each of the carbon fibers CF in the CFRP layer 102. A resin part RP2 is formed in the gap between each of the glass fibers GF in the GFRP layer 103. As described above, since the diameter of each of the glass fibers GF is larger than the diameter of each of the carbon fibers CF, the gap between each of the glass fibers GF in the GFRP layer 103 is wider than the gap between each of the carbon fibers CF in the CFRP layer 102. A resin part RP3 is formed in the gap between each of the carbon fibers CF and each of the glass fibers GF in the interface between the CFRP layer 102 and the GFRP layer 103.

<Carbon Fiber Recovery Method>

Figure 4:
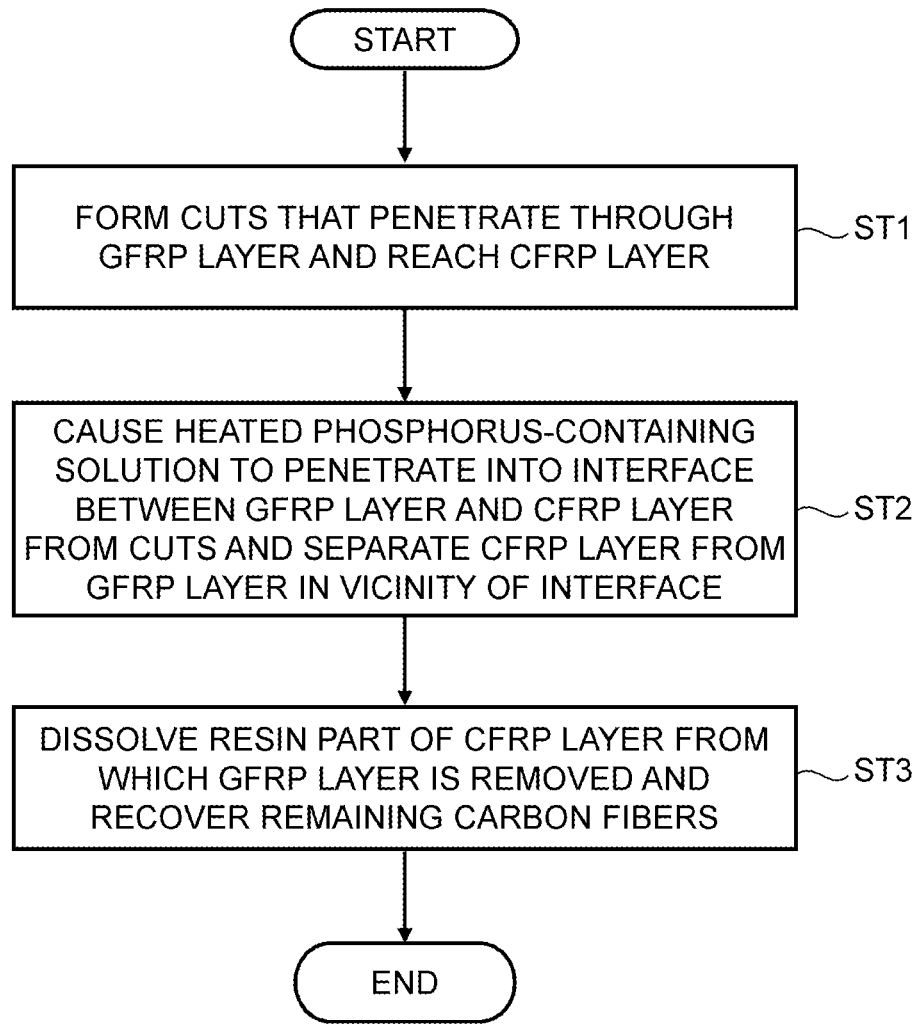
FIG. 4 is a flowchart showing the carbon fiber recovery method according to the first embodiment.

With reference next to FIG. 4, the carbon fiber recovery method according to the first embodiment will be explained. FIG. 4 is a flowchart showing the carbon fiber recovery method according to the first embodiment.

First, as shown in FIG. 4, cuts that penetrate through the GFRP layer 103 formed on the CFRP layer 102 of the fiber reinforced plastic member 10 and reach the CFRP layer 102 are formed (Step ST1).

Figure 5:
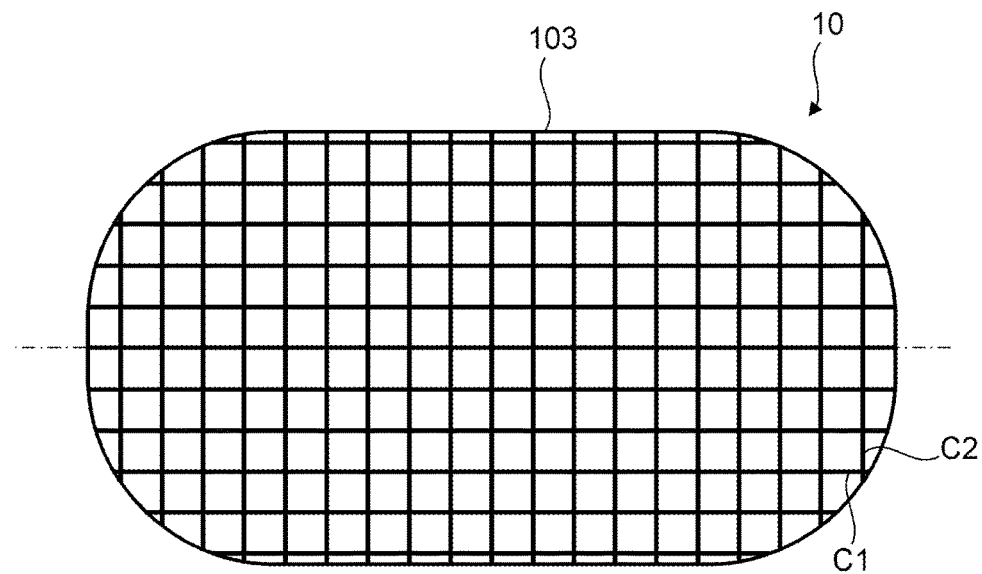
FIG. 5 is an overall side view of the fiber reinforced plastic member in which cuts are formed.
Figure 6:
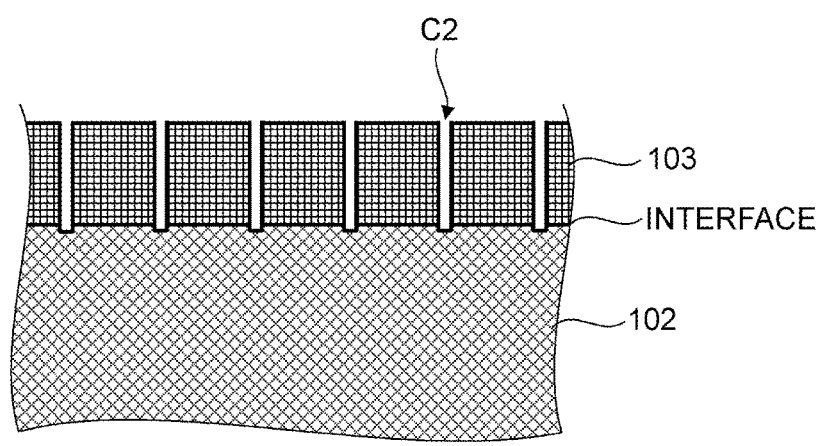
FIG. 6 is a partial cross-sectional view of the fiber reinforced plastic member in which cuts are formed.

FIG. 5 is an overall side view of the fiber reinforced plastic member in which the cuts are formed. In the example shown in FIG. 5, cuts C1 extending in parallel to the central axis of the cylindrical fiber reinforced plastic member 10 and cuts C2 extending in the circumferential direction of the fiber reinforced plastic member 10 are formed in a lattice pattern. Further, FIG. 6 is a partial cross-sectional view of the fiber reinforced plastic member in which the cuts are formed. As shown in FIG. 6, the cuts C2 that penetrate through the GFRP layer 103 and reach the CFRP layer 102 are formed. The same applies for the cuts C1.

It is also possible to form cuts C1 and C2 that penetrate through the CFRP layer 102 as well as the GFRP layer 103 to cut the fiber reinforced plastic member 10. However, it is harder to cut the CFRP layer 102 than it is to cut the GFRP layer 103 and the thickness of the CFRP layer 102 is larger than that of the GFRP layer 103. Therefore, when the cuts C1 and C2 that penetrate also through the CFRP layer 102 are formed, the process time increases and the life of a cutting blade is shortened, which adversely affects productivity and the manufacturing cost. That is, it is preferable that the depth of each of the cuts C1 and C2 into the CFRP layer 102 be as small as possible.

Next, as shown in FIG. 4, a heated phosphorus-containing solution penetrates into the interface between the CFRP layer 102 and the GFRP layer 103 shown in FIG. 6 from the cuts C1 and C2 formed in Step ST1. For example, the fiber reinforced plastic member 10 is immersed in the phosphorus-containing solution. Otherwise, the phosphorus-containing solution may start to be applied from the surface of the fiber reinforced plastic member 10. After that, the CFRP layer 102 and the GFRP layer 103 are separated from each other in the vicinity of the interface (Step ST2).

Figure 7:
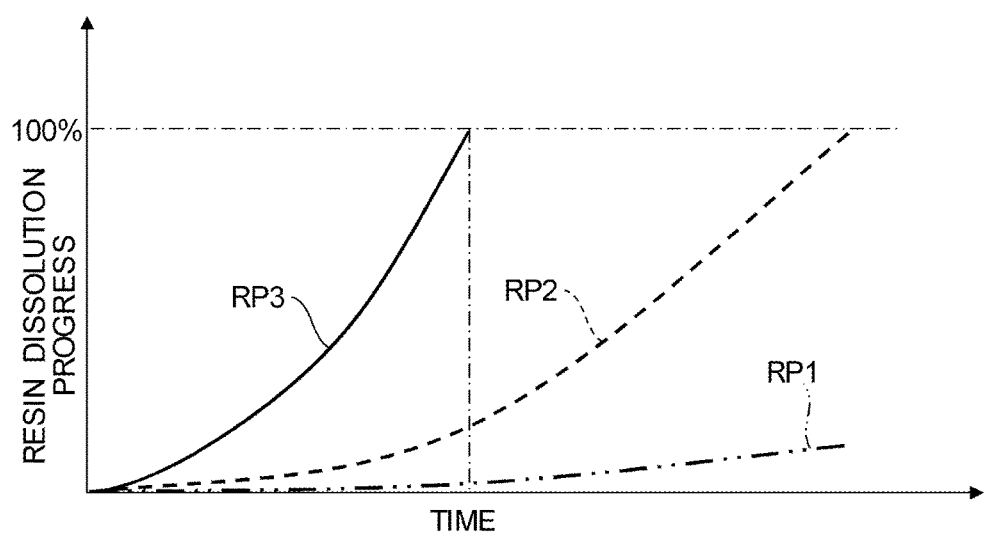
FIG. 7 is a graph showing a dissolution progress of resin parts RP1-RP3 shown in FIG. 3 by a heated phosphorus-containing solution.

FIG. 7 is a graph showing a dissolution progress of the resin parts RP1-RP3 shown in FIG. 3 by the heated phosphorus-containing solution. The horizontal axis indicates time and the vertical axis indicates the resin dissolution progress. The example shown in FIG. 7 shows a case in which the heating temperature of the phosphorus-containing solution is 150° C. and the phosphate concentration of the phosphorus-containing solution is 85%.

As shown in FIG. 7, by causing the heated phosphorus-containing solution to penetrate from the cuts C1 and C2, the resin part RP3 formed in the interface between the CFRP layer 102 and the GFRP layer 103 shown in FIG. 3 is preferentially dissolved. At the timing when the dissolution of the resin part RP3 has been completed, the resin part RP1 formed in the gap between each of the carbon fibers CF and the resin part RP2 formed in the gap between each of the glass fibers GF are hardly dissolved. It is therefore possible to easily separate the CFRP layer 102 from the GFRP layer 103 in the vicinity of the interface.

With reference to FIG. 3, the reason why the resin part RP3 is preferentially dissolved will be explained. As shown in FIG. 3, the gap between each of the fibers in the interface between the CFRP layer 102 and the GFRP layer 103 is larger than that in the CFRP layer 102 and that in the GFRP layer 103. Therefore, the phosphorus-containing solution can easily penetrate into the resin part RP3 formed in the interface between the CFRP layer 102 and the GFRP layer 103. As a result, as shown in FIG. 7, the resin part RP3 is preferentially dissolved.

As shown in FIG. 3, the gap between each of the glass fibers GF is larger than the gap between each of the carbon fibers CF. Therefore, the phosphorus-containing solution penetrates into the resin part RP2 formed in the gap between each of the glass fibers GF more easily than it penetrates into the resin part RP1 formed in the gap between each of the carbon fibers CF. As a result, as shown in FIG. 7, the resin part RP2 formed in the gap between each of the glass fibers GF is dissolved earlier than the resin part RP1 formed in the gap between each of the carbon fibers CF is dissolved.

If the dissolution progress of the resin parts RP1-RP3 become close to one another, when the GFRP layer 103 is separated and removed from the CFRP layer 102, some of the carbon fibers CF are removed as well, which causes a decrease in the yield of the carbon fibers CF. In order to preferentially dissolve the resin part RP3 formed in the interface between the CFRP layer 102 and the GFRP layer 103, the heating temperature of the phosphorus-containing solution is preferably set to be 130-220° C. and the phosphate concentration of the phosphorus-containing solution is preferably set to be 60% or higher. More preferably, the phosphate concentration is set to be 80% or higher.

Furthermore, each of the intervals between the cuts C1 and C2 formed in Step ST1 is preferably 50 mm or smaller and more preferably 30 mm or smaller. When each of the intervals between the cuts C1 and C2 exceeds 50 mm, it becomes hard for the phosphorus-containing solution to penetrate into the resin part RP3 formed in the interface between the CFRP layer 102 and the GFRP layer 103, resulting in that the resin part RP2 formed in the gap between each of the glass fibers GF is dissolved before the resin part RP3 is dissolved. On the other hand, while it is possible to preferentially dissolve the resin part RP3 as the interval between the cuts C1 and C2 becomes narrower, the process time increases.

Last, as shown in FIG. 4, the resin part RP1 of the CFRP layer 102 from which the GFRP layer 103 separated in Step ST2 is removed is dissolved by a resin solution, thereby recovering the remaining carbon fibers CF (Step ST3). The heated phosphorus-containing solution may be used as the resin solution, similar to Step ST2. Further, in order to increase the speed at which the resin part RP1 of the CFRP layer 102 is dissolved, concentrated sulfuric acid may be added to the phosphorus-containing solution. Further, concentrated sulfuric acid that does not include phosphoric acid may be used as the resin solution.

As described above, in the carbon fiber recovery method according to the first embodiment, the heated phosphorus-containing solution penetrates from the cuts C1 and C2 that penetrate into the GFRP layer 103 and the resin part RP3 formed in the interface between the CFRP layer 102 and the GFRP layer 103 is preferentially dissolved. Then, after the GFRP layer 103 is separated and removed from the CFRP layer 102, only the resin part RP1 of the CFRP layer 102 is dissolved by the resin solution and the remaining carbon fibers CF are recovered. It is therefore possible to prevent the glass fibers GF from being mixed with the carbon fibers when the carbon fibers CF are recovered.

EXAMPLES

While this embodiment will be explained in further detail with reference to Examples, this embodiment is not limited to the following Examples.

Table 1 shows the test conditions and results of all the Examples 1-4 and Comparative Examples 1 and 2.

First, test conditions common to all the Examples 1-4 and Comparative Examples 1 and 2 will be explained.

Cuts were formed in a hydrogen tank having a three-layer structure including the plastic liner, the CFRP layer, and the GFRP layer as shown in FIG. 2 and the hydrogen tank was cut into test pieces, each being 30 mm square, for Examples and Comparative Examples. The plastic liner made of a nylon-based resin and having a thickness of 3 mm, the CFRP layer made of an epoxy-based resin and having a thickness of 23 mm, and the GFRP layer made of an epoxy-based resin and having a thickness of 2 mm were used.

Next, resin solutions according to Examples 1-4 and Comparative Examples 1 and 2 shown in Table 1 were put in glass containers and the test pieces were immersed in the respective resin solutions in the glass containers for 10 minutes.

After that, the glass containers that include the respective resin solutions and the test pieces were heated to the heating temperatures shown in Table 1 by an oil bath, and separation and removal of the GFRP layer from the CFRP layer for each test piece was tried. Then it was checked whether the glass fibers (GF) were mixed into the CFRP layer and the yield of recovery of the carbon fibers (CF) was calculated from the mass of the CFRP layer from which the GFRP layer had been removed for each test piece according to Examples 1-4 and Comparative Examples 1 and 2.

TABLE 1

| | Resin solution | Phosphate concentration | Heating temperature | GF mixing | Yield of CF recovery |
|---|---|---|---|---|---|
| Example 1 | Phosphoric acid 100% | 85% | 150° C. | No | 100% |
| Example 2 | Phosphoric acid 70% + concentrated sulfuric acid 30% | 60% | | | 90% |
| Example 3 | Phosphoric acid 50% + concentrated sulfuric acid 50% | 43% | | | 70% |
| Example 4 | Phosphoric acid 30% + concentrated sulfuric acid 70% | 26% | | | 50% |
| Compar- | Concentrated | — | | (Yes) | Recovery |

TABLE 1-continued

| | Resin solution | Phosphate concentration | Heating temperature | GF mixing | Yield of CF recovery |
|---|---|---|---|---|---|
| Comparative Example 1 | sulfuric acid 100% | | | | impossible |
| Comparative Example 2 | Benzyl alcohol + tri-potassium phosphate | | 180° C. | | |

Next, individual conditions and evaluation results of Examples 1-4 and Comparative Examples 1 and 2 will be explained.

Example 1

A phosphorus-containing solution made of only phosphoric acid with the concentration of 85% was used as the resin solution. Therefore, the phosphate concentration was 85%. The heating temperature was 150° C.

In Example 1, the resin part of the interface between the CFRP layer and the GFRP layer was preferentially dissolved and the GFRP layer could be separated and removed from the CFRP layer in the interface. No glass fibers were mixed into the CFRP layer and the yield of recovery of the carbon fibers was 100%.

Figure 8:
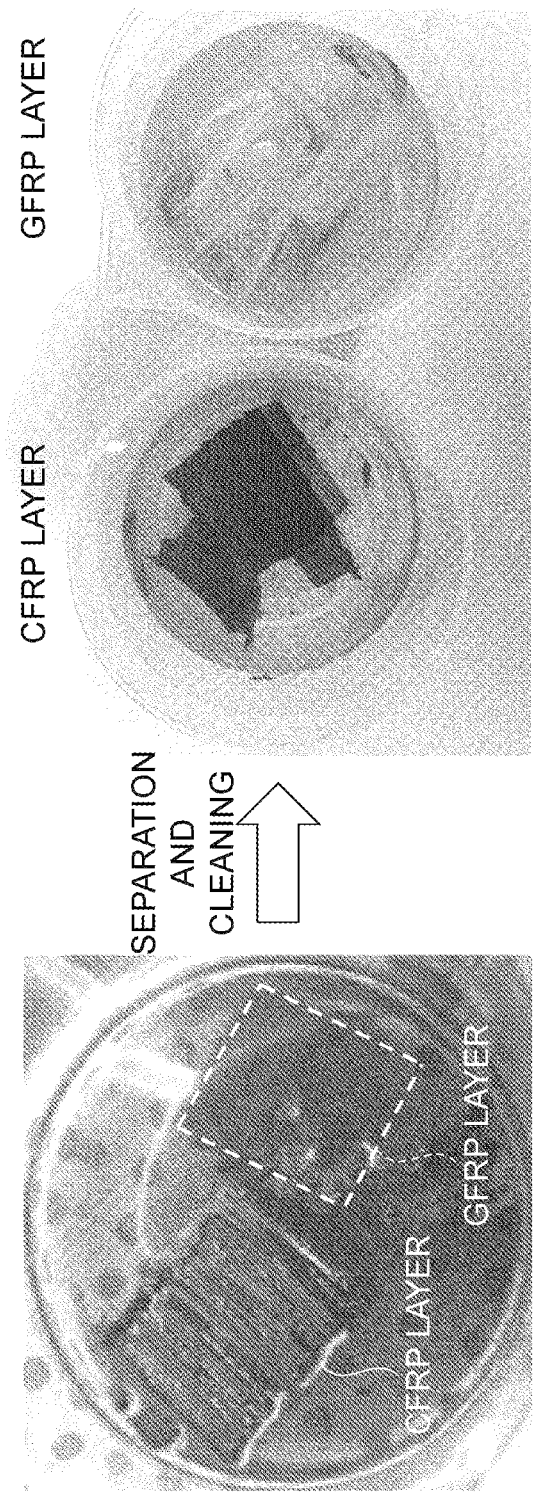
FIG. 8 is photographs showing a state in which the CFRP layer and the GFRP layer are separated from each other in a resin solution and states of the CFRP layer and the GFRP layer after the separation and cleaning.

FIG. 8 are photographs showing a state in which the CFRP layer and the GFRP layer are separated from each other in the resin solution and states of the CFRP layer and the GFRP layer after the separation and cleaning thereof. As shown in FIG. 8, the CFRP layer and the GFRP layer were naturally separated from each other in the resin solution. Therefore, the GFRP layer could be easily removed from the CFRP layer.

Example 2

This Example was carried out under conditions the same as those in Example 1 except that a phosphorus-containing solution obtained by mixing phosphoric acid with the concentration of 85% with concentrated sulfuric acid at a mass ratio of 7:3 was used as the resin solution. The phosphate concentration was 60% (=85%×0.7).

Like in the above Example, in Example 2, the GFRP layer could be separated and removed from the CFRP layer substantially in the interface. No glass fibers were mixed into the CFRP layer.

On the other hand, since the concentrated sulfuric acid had been added, the resin part of the CFRP layer and the resin part of the GFRP layer were further dissolved compared to Example 1. Therefore, some of the carbon fibers were removed when the GFRP layer and the glass fibers were removed, and the yield of recovery of the carbon fibers was 90%.

Example 3

This Example was carried out under conditions the same as those in Example 1 except that a phosphorus-containing solution obtained by mixing phosphoric acid with the concentration of 85% with concentrated sulfuric acid at a mass ratio of 5:5 was used as the resin solution. The phosphate concentration was 43% (=85%×0.5).

Like in the above Examples, in Example 3, the GFRP layer could be separated and removed from the CFRP layer in the vicinity of the interface. No glass fibers were mixed into the CFRP layer.

On the other hand, since the ratio of the concentrated sulfuric acid to the phosphoric acid in this Example was larger than that in Example 2, the dissolution of the resin part of the CFRP layer and the resin part of the GFRP layer advanced, and the yield of recovery of the carbon fibers was 70%.

Example 4

This Example was carried out under conditions the same as those in Example 1 except that a phosphorus-containing solution obtained by mixing phosphoric acid with the concentration of 85% with concentrated sulfuric acid at a mass ratio of 3:7 was used as the resin solution. The phosphate concentration was 26% (=85%×0.3).

Like in the above Examples, in Example 4, the GFRP layer could be separated and removed from the CFRP layer in the vicinity of the interface. No glass fibers were mixed into the CFRP layer.

On the other hand, since the ratio of the concentrated sulfuric acid to the phosphoric acid in this Example was larger than that in Example 3, the dissolution of the resin part of the CFRP layer and the resin part of the GFRP layer further advanced, and the yield of recovery of the carbon fibers was 50%.

Comparative Example 1

This Example was carried out under conditions the same as those in Example 1 except that a resin solution made of only concentrated sulfuric acid was used.

In Comparative Example 1, the dissolution of the resin part of the CFRP layer, the dissolution of the resin part of the GFRP layer, and the dissolution of the resin part of the interface between the CFRP layer and the GFRP layer concurrently advanced. Therefore, the GFRP layer could not be separated or removed from the CFRP layer in the vicinity of the interface. Since the glass fibers could not be separated or removed from the carbon fibers that had remained in the resin solution, the carbon fibers could not be recovered without the glass fibers being mixed therein.

Comparative Example 2

This Example was carried out under conditions the same as those in Example 1 except that a resin solution obtained by adding tri-potassium phosphate as a catalyst to benzyl alcohol was used.

While the dissolution progress in Comparative Example 2 was lower than that in Comparative Example 1, the dissolution of the resin part of the CFRP layer, the dissolution of the resin part of the GFRP layer, and the dissolution of the resin part of the interface between the CFRP layer and the GFRP layer concurrently advanced, similar to Comparative Example 1. Therefore, the GFRP layer could not be separated or removed from the CFRP layer in the vicinity of the interface. Since the glass fibers could not be separated or removed from the carbon fibers that had remained in the resin solution, the carbon fibers could not be recovered without the glass fibers being mixed therein.

As shown in the above Examples, by using the heated phosphorus-containing solution as the resin solution, the GFRP layer could be separated and removed from the CFRP layer in the interface. It is therefore possible to prevent glass fibers from being mixed with the carbon fibers when the carbon fibers are recovered.

Further, by setting the phosphate concentration in the resin solution to be 60% or more, the carbon fibers could be recovered with a high yield.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A carbon fiber recovery method for recovering carbon fibers from a fiber reinforced plastic member having a carbon fiber reinforced plastic layer on which a glass fiber reinforced plastic layer is formed, the method comprising:
    forming a cut that penetrates through the glass fiber reinforced plastic layer and reaches the carbon fiber reinforced plastic layer in the fiber reinforced plastic member;
    causing a heated phosphoric acid-containing solution to penetrate into an interface between the glass fiber reinforced plastic layer and the carbon fiber reinforced plastic layer from the cut and separating the carbon fiber reinforced plastic layer from the glass fiber reinforced plastic layer; and
    dissolving, by a resin solution, a resin part of the carbon fiber reinforced plastic layer from which the glass fiber reinforced plastic layer has been removed and then recovering the carbon fibers of the carbon fiber reinforced plastic layer.

2. The carbon fiber recovery method according to claim 1, wherein when the heated phosphoric acid-containing solution penetrates from the cut, the fiber reinforced plastic member is immersed in the phosphoric acid-containing solution.

3. The carbon fiber recovery method according to claim 1, wherein, when the heated phosphoric acid-containing solution penetrates from the cut, the phosphoric acid-containing solution is applied to a surface of the fiber reinforced plastic member.

4. The carbon fiber recovery method according to claim 1, wherein a phosphate concentration in the phosphoric acid-containing solution is set to be 60 mass % or higher.

5. The carbon fiber recovery method according to claim 1, wherein the resin solution contains concentrated sulfuric acid.

* * * * *